United States Patent
Bai et al.

(10) Patent No.: US 11,723,050 B2
(45) Date of Patent: Aug. 8, 2023

(54) QCL-TYPE-D SOUNDING REFERENCE SIGNAL

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Kiran Venugopal, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 17/090,490

(22) Filed: Nov. 5, 2020

(65) Prior Publication Data
US 2021/0195599 A1 Jun. 24, 2021

Related U.S. Application Data

(60) Provisional application No. 62/951,994, filed on Dec. 20, 2019.

(51) Int. Cl.
*H04W 72/53* (2023.01)
*H04L 25/02* (2006.01)
(Continued)

(52) U.S. Cl.
CPC .............. *H04W 72/53* (2023.01); *H04B 7/01* (2013.01); *H04B 7/024* (2013.01); *H04L 5/0051* (2013.01);
(Continued)

(58) Field of Classification Search
CPC .......... H04W 72/0493; H04W 72/042; H04W 76/27; H04B 7/01; H04B 7/024;
(Continued)

(56) References Cited

U.S. PATENT DOCUMENTS

| | | | | |
|---|---|---|---|---|
| 2019/0297603 | A1* | 9/2019 | Guo | .................... H04W 72/046 |
| 2020/0267571 | A1* | 8/2020 | Park | .................. H04W 72/0446 |
| 2021/0391899 | A1* | 12/2021 | Cao | ...................... H04B 17/373 |

FOREIGN PATENT DOCUMENTS

| | | | | |
|---|---|---|---|---|
| WO | WO-2019049096 | A1 * | 3/2019 | ........... H04B 7/0617 |
| WO | WO-2019066618 | A1 | 4/2019 | |

OTHER PUBLICATIONS

International Search Report and Written Opinion - PCT/US2020/059386 -Isa/Epo - 2021 -02-17 (201300WO).

* cited by examiner

*Primary Examiner* — Shailendra Kumar
(74) *Attorney, Agent, or Firm* — Dalei Dong; Holland & Hart LLP

(57) ABSTRACT

Methods, systems, and devices for wireless communication are described. Generally, the described techniques provide for transmission configuration indication states that indicate quasi-collocation relationships. For example, a user equipment (UE) may transmit an uplink reference signal to a base station and receive, in response, a transmission configuration indication state from the base station that is based on the uplink reference signal. In some examples, the transmission configuration indication state may indicate a quasi-collocation relationship between the uplink reference signal and one or more reference signals associated with a downlink channel. In some implementations, the quasi-collocation relationship may be a spatial relationship between one or more antenna ports associated with the base station used to receive the uplink reference signal and one or more antenna ports used to transmit downlink data. The UE may receive downlink data based on the transmission configuration indication state and the indicated quasi-collocation relationship.

27 Claims, 8 Drawing Sheets

(51) Int. Cl.
*H04L 5/00* (2006.01)
*H04W 76/27* (2018.01)
*H04B 7/024* (2017.01)
*H04B 7/01* (2006.01)
*H04W 72/23* (2023.01)

(52) U.S. Cl.
CPC ......... *H04L 25/0226* (2013.01); *H04W 72/23* (2023.01); *H04W 76/27* (2018.02)

(58) Field of Classification Search
CPC . H04B 7/0695; H04L 5/0051; H04L 25/0226; H04L 5/001; H04L 5/0023; H04L 27/261; H04L 5/0053; H04L 5/0092
See application file for complete search history.

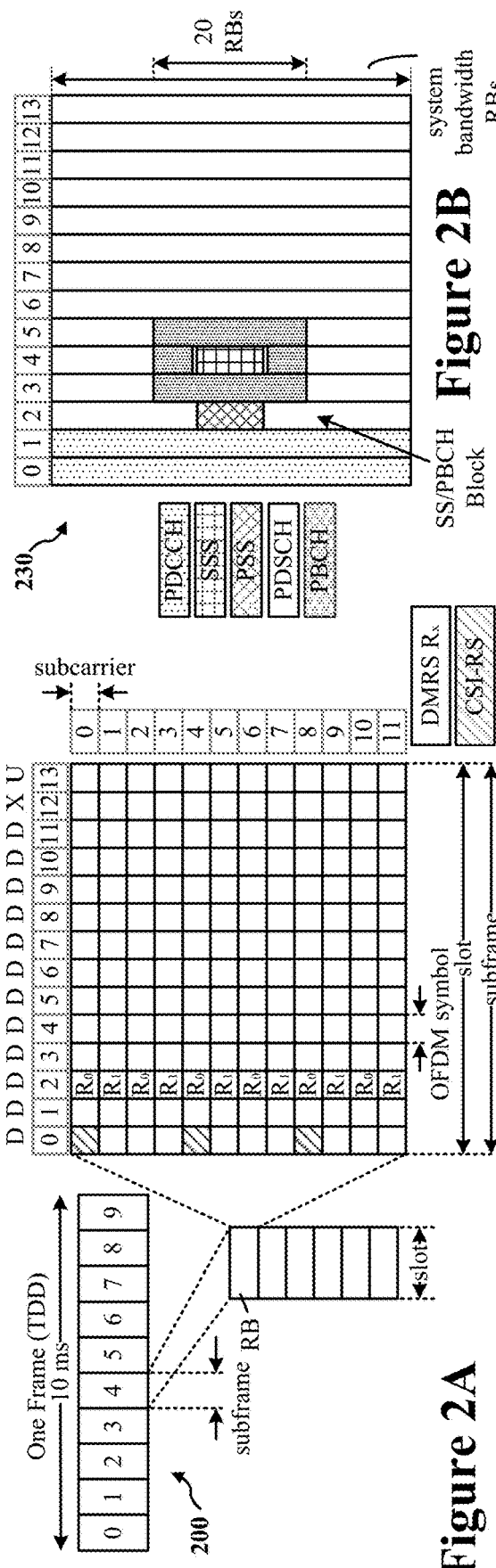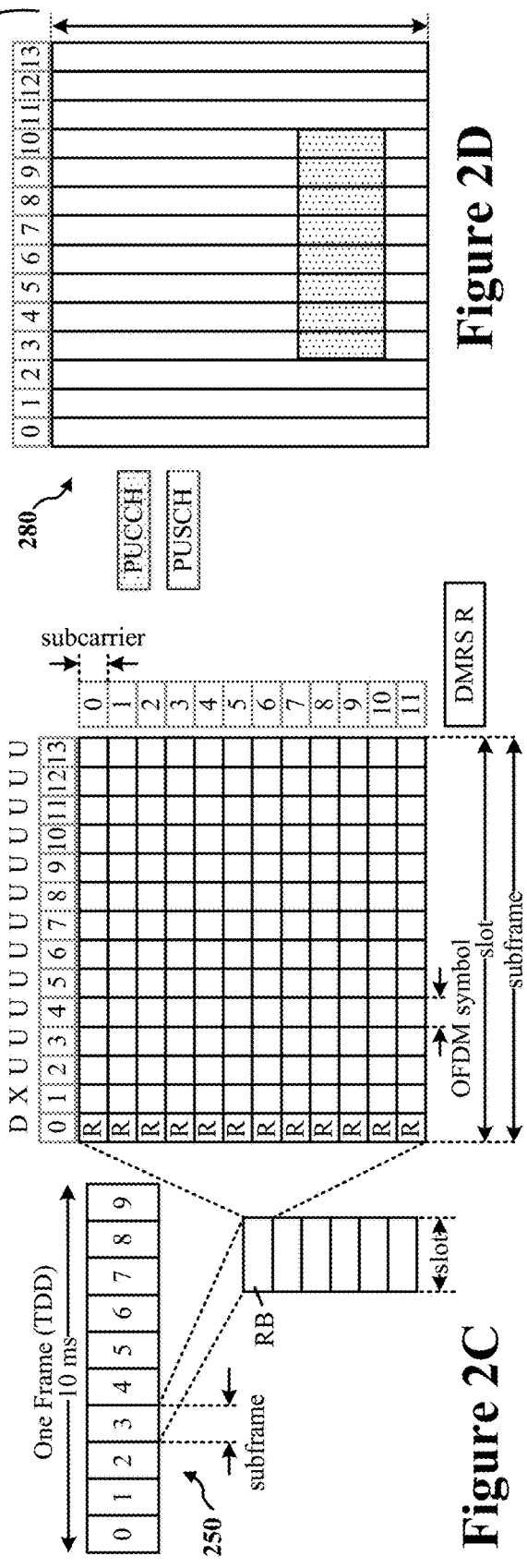
Figure 2A
Figure 2B
Figure 2C
Figure 2D

QCL-TYPE-D SOUNDING REFERENCE SIGNAL

CROSS REFERENCE

The present Application for Patent claims the benefit of U.S. Provisional Patent Application No. 62/951,994 by BAI et al., entitled "QCL-TYPE-D SOUNDING REFERENCE SIGNAL," filed Dec. 20, 2019, assigned to the assignee hereof, and which is hereby incorporated by reference in its entirety.

FIELD OF DISCLOSURE

This disclosure relates generally to wireless communications and, more specifically, to transmission configuration indication (TCI) states indicating quasi-collocation (QCL) relationships.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. An example telecommunication standard is 5G New Radio (NR), which is part of a continuous mobile broadband evolution promulgated by the Third Generation Partnership Project (3GPP) to meet new requirements associated with latency, reliability, security, scalability, and other requirements. 5G NR includes services associated with enhanced mobile broadband (eMBB), massive machine type communications (mMTC), and ultra-reliable low latency communications (URLLC). Improvements in 5G NR technology also may be applicable to other multi-access technologies and the telecommunication standards that employ these technologies.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method for wireless communication. The method may be performed by a user equipment (UE), and may include transmitting an uplink (UL) reference signal to a base station; receiving, from the base station, a transmission configuration indication (TCI) state based at least in part on the UL reference signal; and receiving downlink (DL) data from the base station on a DL channel based at least in part on the TCI state. The TCI state may be received in a downlink control information (DCI) message and may indicate a quasi-collocation (QCL) relationship between the UL reference signal and one or more reference signals of the DL channel. The QCL relationship may be a spatial relationship between one or more first antenna ports used to receive the UL reference signal and one or more second antenna ports used to transmit the DL data. In some aspects, the UL reference signal may be a sounding reference signal (SRS), the DL channel may be a physical downlink shared channel (PDSCH), and the one or more reference signals may include a demodulation reference signal (DM-RS) of the PDSCH.

The TCI state may also indicate a QCL relationship between a channel state information reference signal (CSI-RS) and the one or more reference signals of the DL channel. In some aspects, the QCL relationship between the UL reference signal and the one or more reference signals of the DL channel comprises a QCL-TypeD relationship, and the QCL relationship between the CSI-RS and the one or more reference signals of the DL channel may be one of a QCL-TypeA relationship, a QCL-TypeB relationship, or a QCL-TypeC relationship.

In some implementations, the method may also include receiving the CSI-RS from the base station; determining a number of channel estimation parameters based on the CSI-RS; and decoding the DL data based at least in part on the number of channel estimation parameters determined from the CSI-RS. The channel estimation parameters may include one or more of a Doppler shift, a Doppler spread, an average delay, or an average spread determined for the CSI-RS. In addition, or in the alternative, the method may include concurrently modifying UL and DL beam configurations based on the TCI state.

Another innovative aspect of the subject matter described in this disclosure can be implemented in an apparatus for wireless communications, such as a user equipment (UE). The UE may include one or more processors coupled to a memory. The memory may store instructions that, when executed by the one or more processors, cause the UE to perform operations including transmitting an uplink (UL) reference signal to a base station; receiving, from the base station, a TCI state based at least in part on the UL reference signal; and receiving downlink (DL) data from the base station on a DL channel based on the TCI state. The TCI state may be received in a downlink control information (DCI) message and may indicate a QCL relationship between the UL reference signal and one or more reference signals of the DL channel. The QCL relationship may be a spatial relationship between one or more first antenna ports used to receive the UL reference signal and one or more second antenna ports used to transmit the DL data. In some aspects, the UL reference signal may be a sounding reference signal (SRS), the DL channel may be a physical downlink shared channel (PDSCH), and the one or more reference signals may include a demodulation reference signal (DM-RS) of the PDSCH.

The TCI state may also indicate a QCL relationship between a channel state information reference signal (CSI-RS) and the one or more reference signals of the DL channel. In some aspects, the QCL relationship between the UL reference signal and the one or more reference signals of the DL channel may be a QCL-TypeD relationship, and the QCL relationship between the CSI-RS and the one or more reference signals of the DL channel may be one of a QCL-TypeA relationship, a QCL-TypeB relationship, or a QCL-TypeC relationship.

In some implementations, execution of the instructions may cause the UE to perform operations further including receiving the CSI-RS from the base station; determining a number of channel estimation parameters based at least in part on the CSI-RS; and decoding the DL data based at least in part on the number of channel estimation parameters determined from the CSI-RS. The channel estimation parameters may include one or more of a Doppler shift, a Doppler spread, an average delay, or an average spread determined for the CSI-RS. In addition, or in the alternative, execution of the instructions may cause the UE to perform operations further including concurrently modifying UL and DL beam configurations based on the TCI state.

Another innovative aspect of the subject matter described in this disclosure can be implemented as a method for wireless communication. The method may be performed by a base station, and may include receiving an uplink reference signal from a UE, configuring a set of TCI states, the set of TCI states including at least one TCI state based at least in part on the received uplink (UL) reference signal; and scheduling a physical downlink shared channel (PDSCH) based at least in part on the at least one TCI state associated with the received UL reference signal. In some implementations, the method may also include transmitting the at least one TCI state associated with the received UL reference signal to the UE; and transmitting, on the scheduled PDSCH, DL data to the UE based at least in part on the at least one TCI state. The TCI state may be transmitted to the UE in a DCI message, and may indicate a QCL relationship between the UL reference signal and one or more reference signals of the PDSCH. The QCL relationship may be a spatial relationship between one or more first antenna ports used to receive the UL reference signal and one or more second antenna ports used to transmit the DL data. In some aspects, the UL reference signal may be a sounding reference signal (SRS), and the one or more reference signals may include a demodulation reference signal (DM-RS) of the PDSCH.

The TCI state may also indicate a QCL relationship between a channel state information reference signal (CSI-RS) and the one or more reference signals of the PDSCH. In some aspects, the QCL relationship between the UL reference signal and the one or more reference signals of the PDSCH may be a QCL-TypeD relationship, and the QCL relationship between the CSI-RS and the one or more reference signals of the PDSCH may be one of a QCL-TypeA relationship, a QCL-TypeB relationship, or a QCL-TypeC relationship.

In some other implementations, the method may also include determining a number of channel estimation parameters based on the UL reference signal; and configuring the at least one TCI state based at least in part on the number of channel estimation parameters determined from the UL reference signal. The channel estimation parameters may include one or more of a Doppler shift, a Doppler spread, an average delay, or an average spread determined for the CSI-RS. In addition, or in the alternative, the method may include concurrently modifying UL and DL beam configurations based on the at least one TCI state.

Another innovative aspect of the subject matter described in this disclosure can be implemented in an apparatus for wireless communications, such as base station. The base station may include one or more processors coupled to a memory. The memory may store instructions that, when executed by the one or more processors, cause the UE to perform operations including receiving an uplink reference signal from a UE, configuring a set of TCI states, the set of TCI states including at least one TCI state based at least in part on the received uplink (UL) reference signals; and scheduling a physical downlink shared channel (PDSCH) based at least in part on the at least one TCI state associated with the received UL reference signals. In some implementations, execution of the instructions may cause the base station to perform operations further including transmitting the at least one TCI state associated with the set of UL reference signals to the UE; and transmitting, on the scheduled PDSCH, DL data to the UE based at least in part on the at least one TCI state. The TCI state may be transmitted to the UE in a DCI message, and may indicate a QCL relationship between the UL reference signal and one or more reference signals of the PDSCH. The QCL relationship may be a spatial relationship between one or more first antenna ports used to receive the UL reference signal and one or more second antenna ports used to transmit the DL data. In some aspects, the UL reference signal may be a sounding reference signal (SRS), and the one or more reference signals may include a demodulation reference signal (DM-RS) of the PDSCH.

The TCI state may also indicate a QCL relationship between a channel state information reference signal (CSI-RS) and the one or more reference signals of the PDSCH. In some aspects, the QCL relationship between the UL reference signal and the one or more reference signals of the PDSCH may be a QCL-TypeD relationship, and the QCL relationship between the CSI-RS and the one or more reference signals of the PDSCH may be one of a QCL-TypeA relationship, a QCL-TypeB relationship, or a QCL-TypeC relationship.

In some other implementations, execution of the instructions may cause the base station to perform operations further including determining a number of channel estimation parameters based at least in part on the UL reference signal; and configuring the at least one TCI state based at least in part on the number of channel estimation parameters determined from the UL reference signal. The channel estimation parameters may include one or more of a Doppler shift, a Doppler spread, an average delay, or an average spread determined for the CSI-RS. In addition, or in the alternative, the method may include concurrently modifying UL and DL beam configurations based on the at least one TCI state.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A shows an example of a first Fifth Generation (5G) or New Radio (NR) frame.

FIG. 2B shows example downlink channels within a 5G/NR slot.

FIG. 2C shows an example of a second 5G/NR frame.

FIG. 2D shows example uplink channels within a 5G/NR slot.

Like reference numbers and designations in the various drawings indicate like elements.

DETAILED DESCRIPTION

Figure 1:
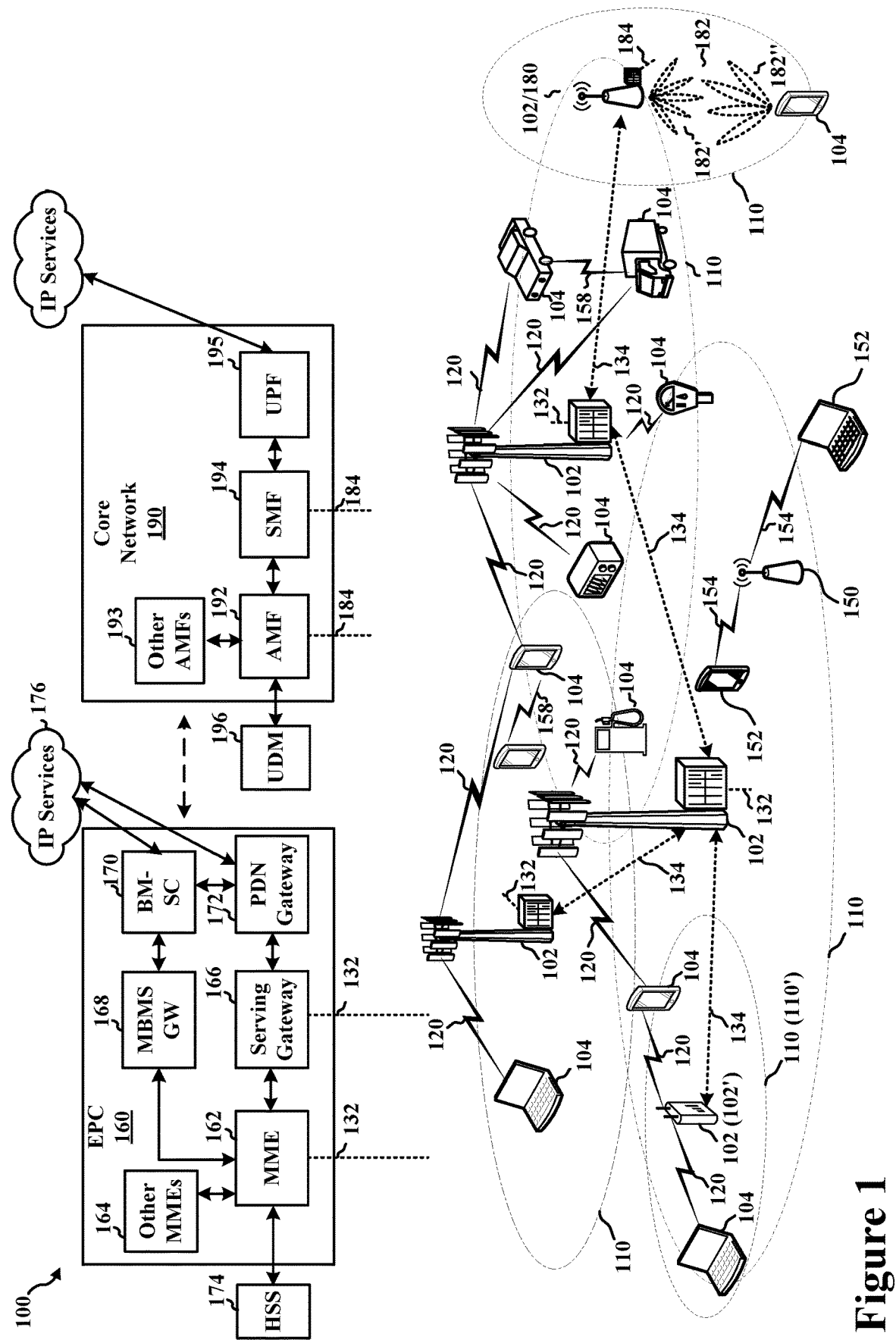
FIG. 1 shows a diagram illustrating an example wireless communications system and access network.

The following description is directed to some implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), Third Generation (3G), Fourth Generation (4G) or Fifth Generation (5G) (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (JOT) network.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system and an access network 100 in accordance with various aspects of the present disclosure. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (such as the S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over backhaul links 134 (such as the X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as a macro base station), may include an eNB, gNodeB (gNB), or another type of base station. Some base stations, such as gNB 180, may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as between 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a service and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A shows an example of a first slot 200 within a 5G/NR frame structure in accordance with aspects of the present disclosure. FIG. 2B shows an example of DL channels 230 within a 5G/NR slot in accordance with aspects of the present disclosure. FIG. 2C shows an example of a second slot 250 within a 5G/NR frame structure in accordance with aspects of the present disclosure. FIG. 2D shows an example of UL channels 280 within a 5G/NR slot in accordance with aspects of the present disclosure. In some cases, the 5G/NR frame structure may be frequency division duplex (FDD) in which, for a set of subcarriers (carrier system bandwidth), slots within the set of subcarriers are dedicated for either DL or UL transmissions. In other cases, the 5G/NR frame structure may be time division duplex (TDD) in which, for a set of subcarriers (carrier system bandwidth), slots within the set of subcarriers are dedicated for both DL and UL transmissions. In the examples shown in FIGS. 2A and 2C, the 5G/NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G/NR frame structure that is based on FDD.

Other wireless communication technologies may have a different frame structure or different channels. A frame may be divided into a number of equally sized subframes. For example, a frame having a duration of 10 microseconds (ms) may be divided into 10 equally sized subframes each having a duration of 1 ms. Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols per slot and $2\mu$ slots per subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz, and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 microseconds ($\mu$s).

A resource grid may be used to represent the frame structure. Each time slot includes a resource block (RB) (also referred to as a physical RB (PRB)) that extends across 12 consecutive subcarriers and across a number of symbols. The intersections of subcarriers and across 14 symbols. The intersections of subcarriers and of the RB define multiple resource elements (REs). The number of bits carried by each RE depends on the modulation scheme.

As illustrated in FIG. 2A, some of the REs carry a reference signal (RS) for the UE. In some examples, one or more REs may carry a demodulation reference signal (DM-RS) (indicated as Rx for one example, where 100x is the port number, but other DM-RS configurations are possible). In some examples, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of subframes of a frame. The PSS is used by a UE 104 to determine subframe or symbol timing and a physical layer identity. A secondary synchronization signal (SSS) may be within symbol 4 of subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one example, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one example. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/negative acknowledgment (NACK) feedback. The PUSCH carries data and may additionally be used to carry a buffer status report (BSR), a power headroom report (PHR), or UCI.

Figure 3:
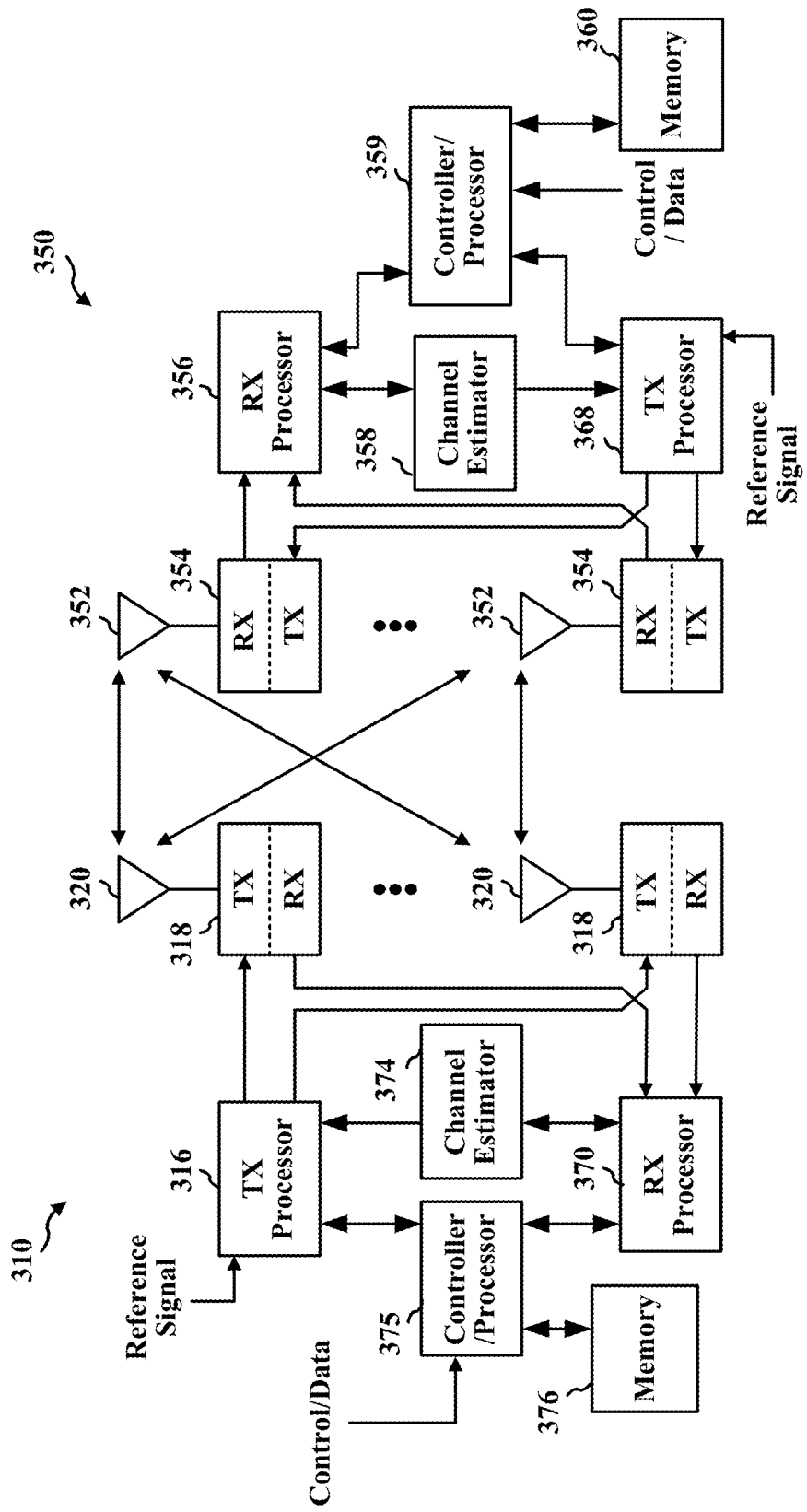
FIG. 3 shows a diagram illustrating an example base station and user equipment (UE) in an access network.

FIG. 3 shows a block diagram of an example base station 310 and UE 350 in an access network in accordance with various aspects of the present disclosure. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot signal) in the time or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/ processor 359 provides RRC layer functionality associated with system information (such as the MIB and SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 350 is coupled to a respective transmitter 354TX. However, in actual implementations, many UEs have fewer transmitters (or transmit chains) than receive (RX) antennas. Although not shown for simplicity, each transmitter may be coupled to a respective power amplifier (PA) which amplifies the signal to be transmitted. The combination of a transmitter with a PA may be referred to herein as a "transmit chain" or "TX chain." To save on cost or die area, the same PA may be reused to transmit signals over multiple RX antennas. In other words, one or more TX chains of a UE may be switchably coupled to multiple RX antennas ports.

In some wireless communications systems, a base station may communicate with a UE using multiple antennas. For one example, a base station may transmit parallel data streams to the UE using different antennas to increase throughput (rather than transmitting the data streams sequentially using the same antenna). For another example, a base station may transmit a given data stream to the UE using multiple antennas to increase the spatial diversity of DL transmissions. The use of multiple antennas to transmit data may be based on antenna ports, which are logical entities that can map multiple data streams to a plurality of antennas. Each antenna port may be associated with a reference signal, for example, so that UEs are able to distinguish between multiple data streams transmitted from different antennas of the base station.

Some antenna ports may be quasi-collocated relative to each other, for example, such that the spatial parameters of a transmission on one antenna port may be inferred from the spatial parameters of another transmission on another antenna port. A UE may be able to perform channel estimation for demodulating data or control information received from a first set of antenna ports based on reference signals received from a second set of antenna ports that are quasi-collocated with the first set of antenna ports. As such, a QCL relationship between antenna ports may increase the ability of the UE to receive and correctly decode DL transmissions from a base station.

A base station may configure a set of transmission configuration indication (TCI) states that indicate QCL relationships between antenna ports used for DL transmissions to the UE. Each TCI state may be associated with a set of DL reference signals and may indicate a QCL relationship between antenna ports used to transmit the associated set of DL reference signals and antenna ports used to transmit DL data to a UE. When the UE receives an indication of a TCI state from the base station, the UE may determine that a first set of antenna ports used to transmit the reference signals associated with the indicated TCI state are quasi-collocated with a second set of antenna ports used to transmit DL data to the UE. The QCL relationship between the first and second sets of antenna ports may allow the UE to use channel conditions or channel estimation parameters determined from the reference signals associated with the indicated TCI state for demodulating DL data received from the base station. For example, if a TCI state indicates that the antenna ports used to transmit CSI-RSs have a QCL relationship with the antenna ports used to transmit DL data, the UE may use channel information derived from the CSI-RSs to demodulate or decode the DL data.

As mentioned above, TCI states may be associated with or mapped to DL reference signals transmitted by the base station and may allow a base station to change DL beam indications by modifying or updating TCI states. For example, a TCI state may use a specific DL reference signal (such as one of an SSB, a CSI-RS, or a TRP) as the reference signal resource, and defines a QCL relationship between the antenna ports used for transmitting the DL reference signal and the antenna ports used for DL transmissions to the UE. The QCL relationship indicated in the TCI state may allow a UE to use channel estimation parameters determined from the DL reference signal for decoding the DL transmissions. A base station may change the DL beam indication by using a different TCI state that indicates a QCL relationship between the DL reference signal and the antenna ports used to transmit DL data on different beams. Because some TCI states may not include or define QCL relationships for UL reference signals, some TCI states may not be able to change UL beam indications, which may result in asymmetries between DL and UL beam management.

Various implementations of the subject matter disclosed herein may allow a base station to concurrently change DL and UL beam indications using a single TCI state by mapping the TCI state to an UL reference signal and defining at least one QCL relationship between the UL reference signal and the antenna ports used for DL transmissions to the UE. In accordance with some aspects of the present disclosure, an UL reference signal may be used as the reference signal resource of a TCI state, and the TCI state may indicate a QCL relationship between the antenna ports used to receive the UL reference signal and the antenna ports used for DL transmissions to the UE. In some aspects, a sounding reference signal (SRS) may be used as the reference signal resource of the TCI state, which may indicate a QCL relationship between the antenna ports used to receive the SRS and the antenna ports used for DL transmissions. In this manner, the TCI state may be linked or mapped to UL resources, which in turn may allow the base station to control or change UL beam indications based on the TCI state indicated to the UE.

The QCL relationship indicated by the TCI state may not include channel estimation parameters which allow a UE to decode DL data using channel information based on one or more associated reference signals. For example, while Type-A, Type-B, and Type-C QCL relationships each indicate at least two channel estimation parameters that can be used by a UE to decode DL data transmitted from the base station, a Type-D QCL relationship indicates spatial RX parameters (rather than channel estimation parameters). In some implementations, if a TCI state indicates a Type-D QCL relationship between the SRS and the antenna ports used for DL transmissions, the base station (or a suitable network entity) may configure the TCI state to also indicate a QCL relationship between a DL reference signal and the antenna ports used for DL transmissions so that the UE can decode DL data based at least in part on channel conditions previously determined for the DL reference signal. In some aspects, a channel state information reference signal (CSI-RS) may be selected as the DL reference signal, and the corresponding QCL relationship may indicate one or more channel estimation parameters associated with the CSI-RS.

Accordingly, implementations of the subject matter disclosed herein may use a "bidirectional" TCI state that includes a first QCL relationship associated with UL reference signals and also includes a second QCL relationship associated with DL reference signals. A base station may use the bidirectional TCI state to concurrently control or change DL beam indications and UL beam indications. In this manner, the base station may change DL and UL beam indications at the same time using a single TCI state, thereby unifying DL and UL beam indications.

Figure 4:
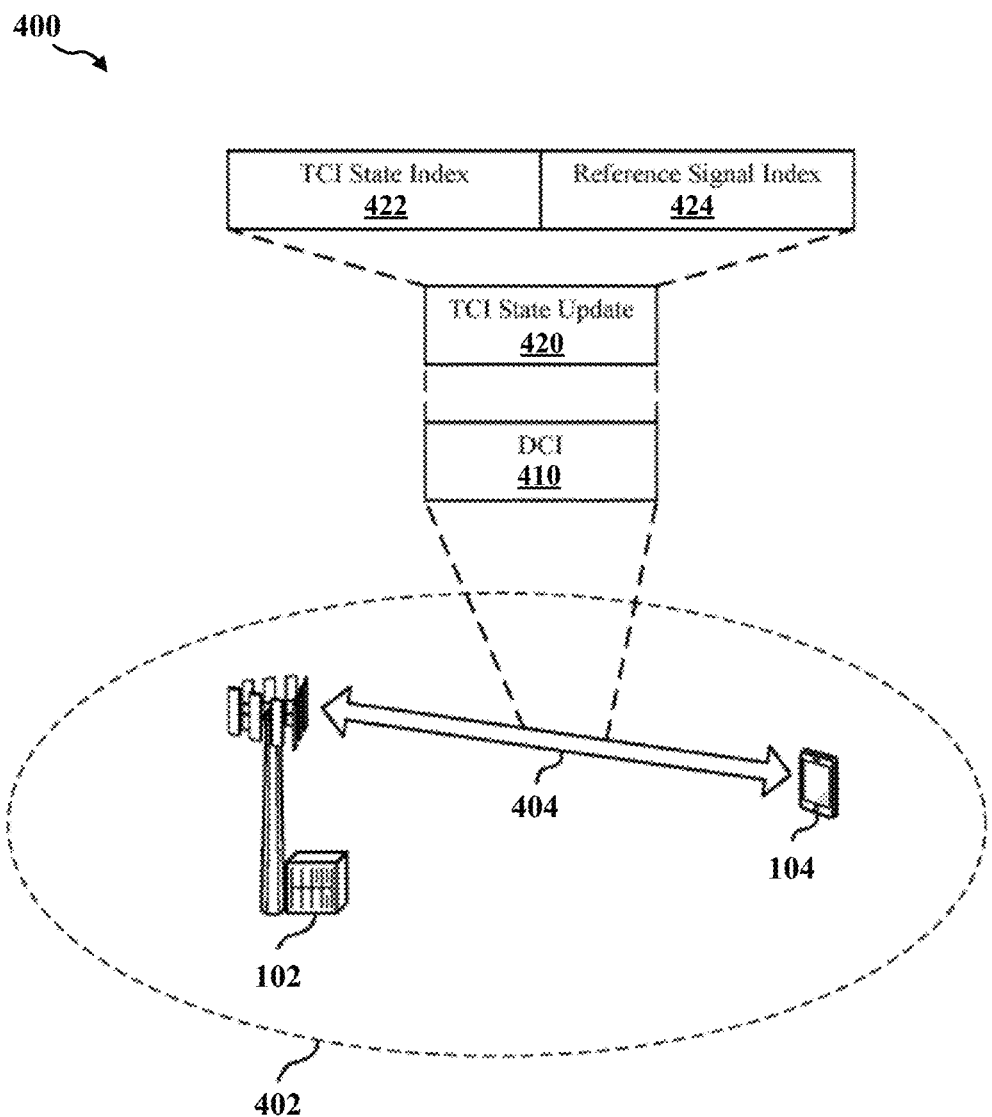
FIG. 4 shows an example wireless communications system that supports bidirectional transmission configuration indication states.

FIG. 4 shows an example wireless communications system 400 that supports bidirectional TCI states in accordance with various aspects of the present disclosure. The wireless communications system 400 is shown to include the base station 102 and the UE 104 of FIG. 1 and may implement various aspects of the wireless communications system 100 and access network of FIG. 1. The base station 102, which may communicate with the UE 104 (and other UEs not shown for simplicity) within coverage area 402 via one or more UL/DL links 404, may configure a set of TCI states that correspond to different QCL relationships between antenna ports used for DL transmissions to the UE 104. The set of configured TCI states may be provided to the UE 104 in an RRC configuration, in one or more DCI messages, or using some other suitable DL signaling. The base station 102 may also configure a number of bidirectional TCI states that can be used to concurrently control or change DL and UL beam indications.

In some other implementations, the base station 102 may generate updated TCI information that can be used to update or replace TCI states (or portions of selected TCI states) based on any number of factors or conditions. For example, in some instances, the QCL relationships indicated by one or more of the configured TCI states may become outdated or invalid due to changing channel conditions. The base station 102 may update one or more TCI states (or one or more portions of selected TCI states) by transmitting updated TCI information to the UE 104, for example, in a DCI message 410. The UE 104 may receive the DCI message 410, extract updated TCI state information contained therein, and update locally stored TCI states based on the updated TCI state information provided by the base station 102.

The DCI message 410 may include a TCI state update field 420 for storing a number of updated TCI states (or portions thereof). The TCI state update field 420 is shown to include a TCI state index 422 and a reference signal index 424. The TCI state index 422 may identify the TCI state being updated, and the reference signal index 424 may identify an updated set of reference signals associated with each TCI state being updated. In some aspects, the TCI state index 422 may also identify an updated set of reference signals associated with the TCI state being updated.

Figure 5:
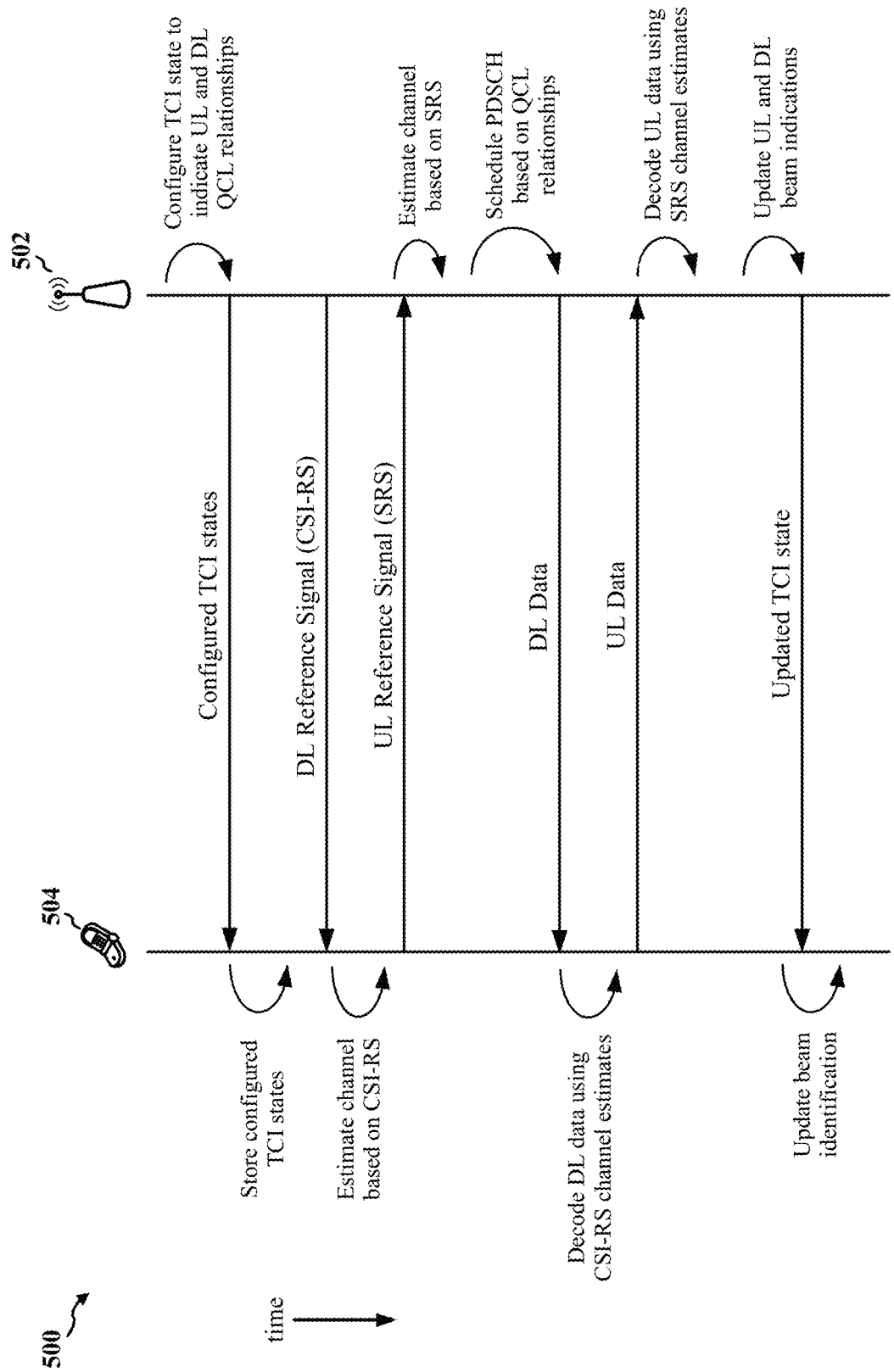
FIG. 5 shows a sequence diagram for wireless communication between a base station and a UE.

FIG. 5 shows a sequence diagram depicting communications 500 between a base station 502 and a UE 504 in a radio access network (RAN) in accordance with various aspects of the present disclosure. The base station 502 may be any suitable entity that communicates with one or more UEs (such as the UE 504), and may be a Node B, enhanced/evolved NB (eNB), 5G NB, gNB, access point (AP), or a transmission reception point (TRP). In some aspects, the base station 502 may be one example of the base station 102 of FIG. 1 or the base station 310 of FIG. 3, and the UE 504 may be one example of the UE 104 of FIG. 1 or the UE 350 of FIG. 3.

The base station 502 configures a set of TCI states that indicate UL and DL QCL relationships. As discussed above, a Type-D UL QCL relationship may indicate spatial RX parameters, rather than channel estimation parameters, and may allow the base station 502 to use channel estimates based on a UL reference signal (such as the SRS) to decode UL data received from the UE 504. The DL QCL relationship may allow the UE 504 to use channel estimates based on a DL reference signal (such as the CSI-RS) to decode DL data received from the base station 502. In some implementations, a TCI state indicating both the UL QCL relationship and the DL QCL relationship may be used to control or change UL and DL beam indications at the same time. For the example of FIG. 5, the DL QCL relationship is associated with a CSI-RS transmitted from the base station 502, and the UL QCL relationship is associated with a SRS transmitted from the UE 504.

The base station 502 transmits the CSI-RS to the UE 504, and the UE 504 estimates channel conditions based on the CSI-RS. In some implementations, the UE 504 may measure one or more of the Doppler shift, Doppler spread, average delay, or average spread based on the CSI-RS. The UE 504 transmits the SRS to the base station 502, and the base station 502 estimates channel conditions based on the SRS. In some implementations, the base station 502 may measure one or more of the Doppler shift, Doppler spread, average delay, or average spread based on the SRS. The UE 504 may use the estimated channel conditions based on the CSI-RS to decode DL transmissions from the base station 502, and the base station 502 may use the estimated channel conditions based on the SRS to decode UL transmissions from the UE 504.

The base station 502 may determine to change the UL and DL beams and may indicate the change to the UE 504 by transmitting an updated TCI state to the UE 504. The updated TCI state may include a new DL beam indication and a new UL beam indication.

Figure 6:
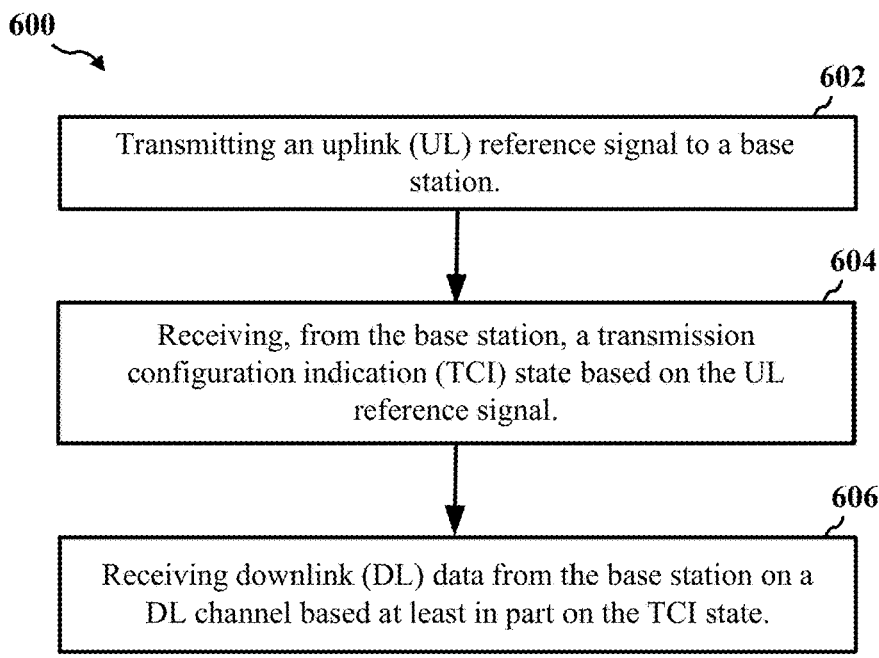
FIG. 6 shows a flowchart depicting an example operation for wireless communication between a base station and a UE.

FIG. 6 shows a flowchart depicting an example operation 600 for wireless communications between a base station and a UE in accordance with various aspects of the present disclosure. The operation 600 may be performed by a wireless communication device such as the UE 104 of FIG. 1, the UE 350 of FIG. 3, or the UE 504 of FIG. 5. At block 602, the UE transmits an uplink (UL) reference signal to a base station. At block 604, the UE receives, from the base station, a TCI state based on the UL reference signal. At block 606, the UE receives downlink (DL) data from the base station on a DL channel based at least in part on the TCI state.

The TCI state may indicate a QCL relationship between the UL reference signal and one or more reference signals of the DL channel. The QCL relationship may be a spatial relationship between one or more first antenna ports of the base station that received the UL reference signal and one or more second antenna ports of the base station used for DL transmissions to the UE. In some implementations, the UL reference signal may be a sounding reference signal (SRS) transmitted by the UE. The base station may estimate channel conditions and determine a number of channel estimation parameters based on the received SRS. The base station may use the channel estimation parameters determined from the SRS to configure or schedule DL resources. In some aspects, the SRS may be part of a set of configured reference signal resources available to the UE.

In some implementations, the TCI state may also indicate a QCL relationship between a channel state information reference signal (CSI-RS) and the one or more reference signals of the DL channel. In some aspects, the QCL relationship between the UL reference signal and the one or more reference signals of the physical downlink channel may be a QCL-TypeD, and the QCL relationship between the CSI-RS and the one or more reference signals of the physical downlink channel may be one of a QCL-TypeA, a QCL-TypeB, or a QCL-TypeC. As discussed above, a TypeD QCL relationship indicates a spatial relationship between antenna ports used for receiving UL signals and antenna ports for transmitting DL data, and each of the QCL-TypeA, QCL-TypeB, and QCL-TypeC relationships indicate one or more channel estimation parameters. For example, a QCL-TypeA relationship indicates Doppler shift, Doppler spread, average delay, and delay spread, a QCL-TypeB relationship indicates Doppler shift and Doppler spread, and a QCL-TypeC relationship indicates Doppler shift and average delay.

The UL reference signal may be any suitable reference signal from which the base station can estimate channel conditions or determine a number of channel estimation parameters. In some implementations, the UL reference signal may be an SRS transmitted from the UE, and the base station may determine channel estimation parameters based on the SRS. In some aspects, the channel estimation parameters may include one or more of a Doppler shift, a Doppler spread, an average spread, and an average delay.

Figure 7A:
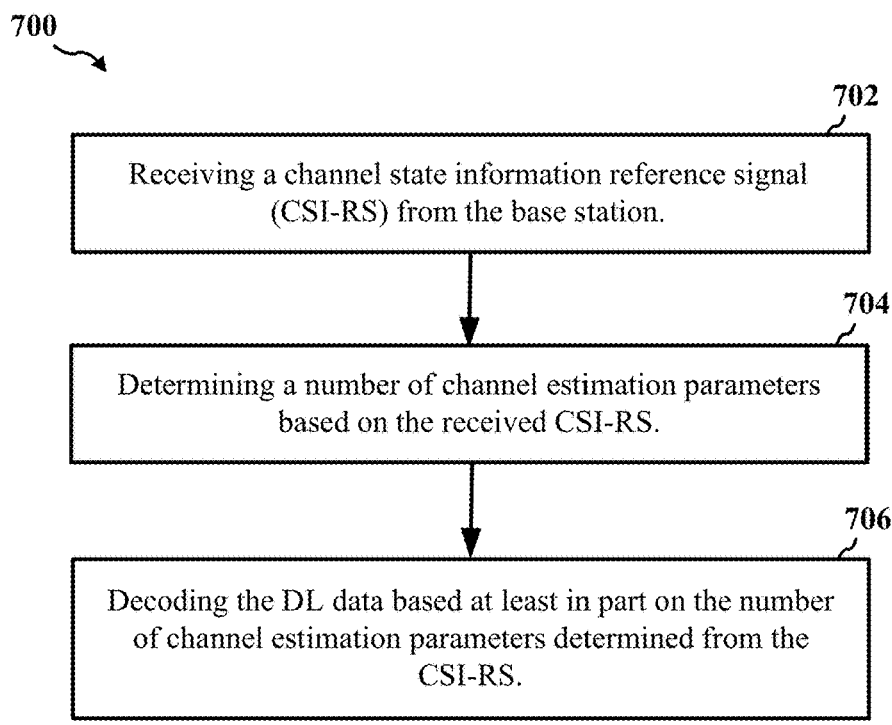
FIGS. 7A and 7B show flowcharts depicting example operations for wireless communication between a base station and a UE.

FIG. 7A shows a flowchart depicting an example operation 700 for wireless communications between a base station and a UE in accordance with various aspects of the present disclosure. The operation 700 may be performed by a wireless communication device such as the UE 104 of FIG. 1, the UE 350 of FIG. 3, or the UE 504 of FIG. 5. In some implementations, the operation 700 begins before the UE receives DL data in block 606 of FIG. 6. For example, at block 702, the UE receives a channel state information reference signal (CSI-RS) from the base station. At block 704, the UE determines a number of channel estimation parameters based on the received CSI-RS. At block 706, the UE decodes the DL data based at least in part on the number of channel estimation parameters determined from the CSI-RS.

The CSI-RS transmitted to the UE may be a periodic CSI-RS, a semi-periodic CSI-RS, or an aperiodic CSI-RS. The UE may use a quality of the CSI-RS to determine a modulation and coding scheme (MCS) for UL transmissions. In addition, or in the alternative, the UE may use the CSI-RS signal to determine channel quality information (CQI) and rank indicator (RI) feedback. In some implementations, the base station may estimate channel conditions based on the SRS received from the UE, derive a beamforming matrix based on the estimated channel conditions, and transmit the CSI-RS to the UE on a DL channel according to the beamforming matrix.

Figure 7B:
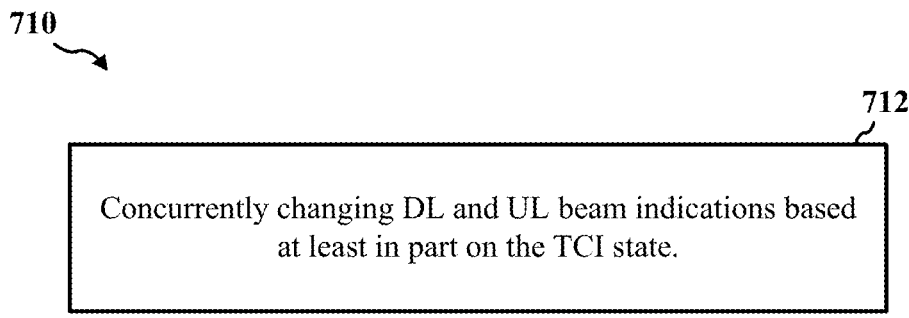

FIG. 7B shows a flowchart depicting an example operation 710 for wireless communications between a base station and a UE in accordance with various aspects of the present disclosure. The operation 710 may be performed by a wireless communication device. In some implementations, the operation 710 begins after the UE receives the TCI state in block 604 of FIG. 6. In some other implementations, the operation 710 may be separate from the operation 600 of FIG. 6 and may be performed at any suitable time. For example, at block 712, the UL and DL beam indications may be concurrently changed based at least in part on the TCI state. In some implementations, the UL and DL beam configurations may be modified based on one or more TCI states transmitted from the base station in DCI messages.

Figure 8:
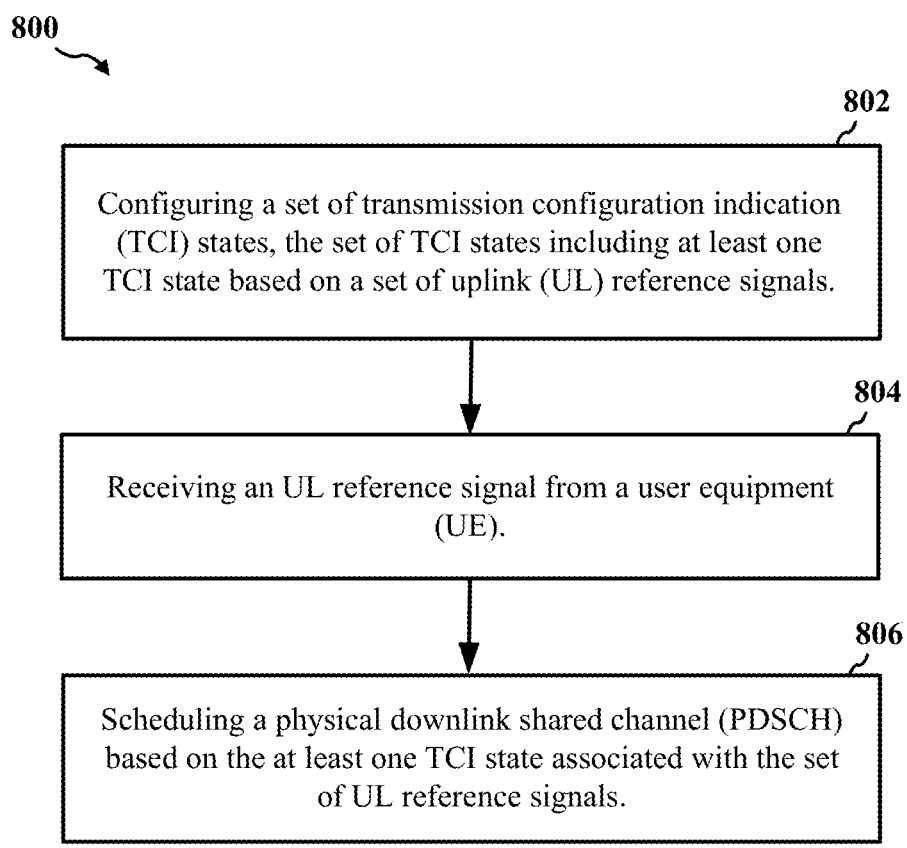
FIG. 8 shows a flowchart depicting an example operation for wireless communication between a base station and a UE.

FIG. 8 shows a flowchart depicting an example operation for wireless communications, a base station, and a UE in accordance with various aspects of the present disclosure. The operation 800 may be performed by a wireless communication device such as the base station 102 of FIG. 1, the base station 310 of FIG. 3, or the base station 502 of FIG. 5. At block 802, the base station configures a set of TCI states, the set of TCI states including at least one TCI state based on a set of uplink (UL) reference signals. At block 804, the base station receives an UL reference signal from a user equipment (UE). At block 806, the base station schedules a physical downlink shared channel (PDSCH) based on the at least one TCI state associated with the set of UL reference signals.

In some implementations, the configured set of TCI states may be provided to the UE as part of a radio resource control (RRC) configuration. The UL reference signal may be any suitable reference signal from which the base station can estimate channel conditions or channel quality. In some aspects, the base station may determine a number of channel estimation parameters (such as a Doppler shift, a Doppler spread, an average spread, and an average delay) based on the UL reference signal. The channel estimation parameters may be used to determine a beamforming matrix, an MCS, and other configurations for DL transmissions to the UE.

In some implementations, the UL reference signal may be a sounding reference signal (SRS) that serves as the reference signal resource of the at least one TCI state, and the at least one TCI state may indicate a QCL relationship between the SRS and one or more reference signals of the PDSCH. The at least one TCI state may also indicate a QCL relationship between a DL reference signal and the one or more reference signals of the PDSCH. In some aspects, the DL reference signal may be a CSI-RS, and the at least one TCI state may indicate the QCL relationship between the CSI-RS and the one or more reference signals of the PDSCH.

In some implementations, the base station may use the QCL relationships indicated by the at least one TCI state to schedule DL transmissions on the PDSCH.

Figure 9A:
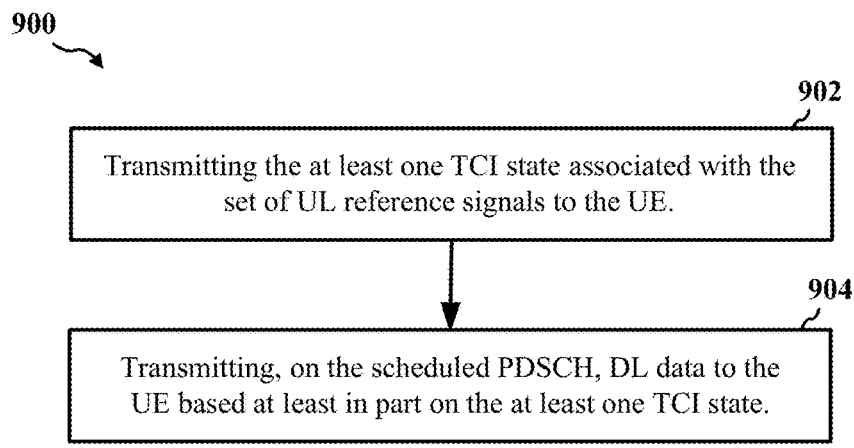
FIGS. 9A, 9B, and 9C show flowcharts depicting example operations for wireless communication between a base station and a UE.

FIG. 9A shows a flowchart depicting an example operation 900 for wireless communications between a base station and a UE in accordance with various aspects of the present disclosure. The operation 900 may be performed by a wireless communication device such as the base station 102 of FIG. 1, the base station 310 of FIG. 3, or the base station 502 of FIG. 5. In some implementations, the operation 900 begins after the base station schedules the PDSCH in block 806 of FIG. 8. For example, at block 902, the base station transmits the at least one TCI state associated with the set of UL reference signals to the UE. At block 904, the base station transmits, on the scheduled PDSCH, DL data to the UE based at least in part on the at least one TCI state.

The TCI state, which may be transmitted to the UE in a DCI message (or using some other suitable DL signaling), may indicate a QCL relationship between the SRS and a reference signal of the PDSCH. In some aspects, the QCL relationship may be a spatial relationship between antenna ports of the base station used to receive the SRS and antenna ports of the base station used to transmit DL data on the PDSCH. The UE may use the QCL indication to identify the beam selected by the base station for DL transmissions to the UE. In some implementations, the UE may infer, based on the presence of the QCL indication in the received TCI state, that the base station has or will schedule a DL transmission on the same beam that was used to receive the SRS from the UE.

The TCI state may also indicate a QCL relationship between a DL reference signal and the one or more reference signals of the PDSCH. In some implementations, the QCL relationship may be between the CSI-RS and the DM-RS of the PDSCH. The UE may use the indicated QCL relationship between the CSI-RS and the DM-RS to decode DL data transmitted on the PDSCH by the base station. More specifically, the UE may use one or more channel estimation parameters based on the CSI-RS to decode DL data received on the PDSCH from the base station. In some aspects, the QCL relationship between the SRS and the PDSCH reference signals may be a QCL-TypeD, and the QCL relationship between the CSI-RS and the PDSCH reference signal may be one of a QCL-TypeA, a QCL-TypeB, or a QCL-TypeC.

Figure 9B:
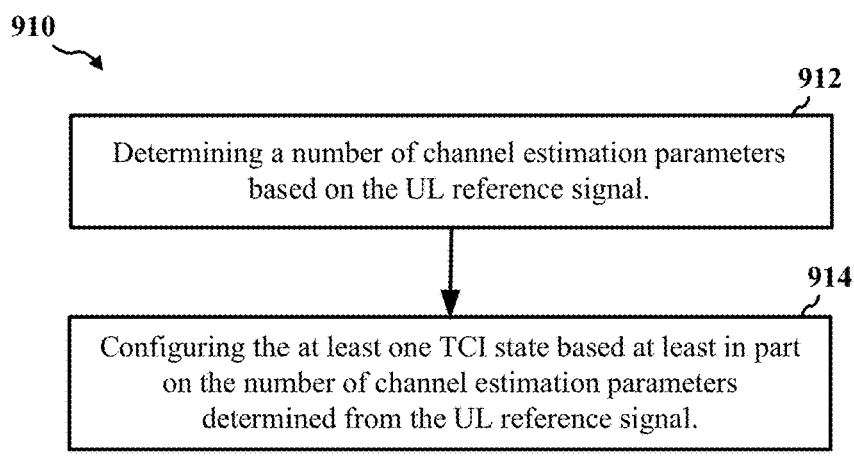

FIG. 9B shows a flowchart depicting an example operation 910 for wireless communications between a base station and a UE in accordance with various aspects of the present disclosure. The operation 910 may be performed by a wireless communication device such as the base station 102 of FIG. 1, the base station 310 of FIG. 3, or the base station 502 of FIG. 5. In some implementations, the operation 910 begins after the base station receives the UL reference signal in block 804 of FIG. 8. For example, at block 912, the base station determines a number of channel estimation parameters based on the UL reference signal. At block 914, the base station configures the at least one TCI state based at least in part on the number of channel estimation parameters determined from the UL reference signal.

In some implementations, the base station may determine one or more channel estimation parameters based on an SRS received from the UE on an UL channel. The channel estimation parameters, which may include one or more of a Doppler shift, a Doppler spread, an average delay, or an average spread, may be used by the base station for UL and DL beam configurations. In some implementations, the base station may use one or more of the Doppler shift, Doppler spread, average delay, or average spread determined from the SRS to configure the at least one TCI state. In addition, or in the alternative, the base station may use the channel estimation parameters based on the SRS to determine a beamforming matrix for CSI-RS transmissions to the UE.

Figure 9C:
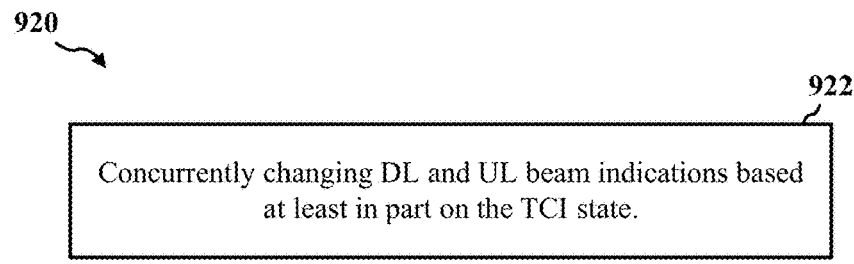

FIG. 9C shows a flowchart depicting an example operation 920 for wireless communications between a base station and a UE in accordance with various aspects of the present disclosure. The operation 920 may be performed by a wireless communication device such as the base station 102 of FIG. 1, the base station 310 of FIG. 3, or the base station 502 of FIG. 5. In some implementations, the operation 920 begins after the base station transmits the at least one TCI state to the UE in block 902 of FIG. 9A. For example, at block 922, the UL and DL beam indications may be currently changed based at least in part on the TCI state.

The following provides an overview of aspects of the present disclosure:

Aspect 1: A method for wireless communication performed by a UE, comprising: transmitting an uplink (UL) reference signal to a base station; receiving, from the base station, a transmission configuration indication (TCI) state based on the UL reference signal; and receiving DL data from the base station on a DL channel based at least in part on the TCI state.

Aspect 2: The method of aspect 1, wherein the UL reference signal serves as a reference signal resource of the TCI state.

Aspect 3: The method of aspect 2, wherein the QCL relationship comprises a spatial relationship between one or more first antenna ports used to receive the UL reference signal and one or more second antenna ports used to transmit the DL data.

Aspect 4: The method of aspect 3, wherein the UE transmits the SRS and receives the DL data on a same beam indicated by the TCI state.

Aspect 5: The method of aspect 4, wherein the QCL relationship between the UL reference signal and the one or more reference signals of the DL channel comprises a QCL-TypeD relationship, and the QCL relationship between the CSI-RS and the one or more reference signals of the DL channel comprises one of a QCL-TypeA relationship, a QCL-TypeB relationship, or a QCL-TypeC relationship.

Aspect 6: The method of any of aspects 4 through 5, wherein the QCL relationships comprise an RRC configuration.

Aspect 7: The method of aspect 6, wherein the number of channel estimation parameters includes one or more of a Doppler shift, a Doppler spread, an average delay, or an average spread.

Aspect 8: The method of any of aspects 4 through 7, further comprising: receiving the CSI-RS from the base station; determining a number of channel estimation parameters based on the CSI-RS; and decoding the DL data based at least in part on the number of channel estimation parameters determined from the CSI-RS.

Aspect 9: The method of any of aspects 2 through 8, wherein the UL reference signal comprises an SRS, the DL channel comprises an PDSCH, and the one or more reference signals comprise a demodulation reference signal (DM-RS) of the PDSCH.

Aspect 10: The method of any of aspects 2 through 9, wherein the TCI state further indicates a QCL relationship between a channel state information reference signal (CSI-RS) and the one or more reference signals of the DL channel.

Aspect 11: The method of any of aspects 1 through 10, wherein the TCI state indicates a quasi-collocation (QCL)

relationship between the UL reference signal and one or more reference signals of the DL channel.

Aspect 12: The method of any of aspects 1 through 11, wherein the TCI state is received from the base station in a DCI message.

Aspect 13: The method of any of aspects 1 through 12, wherein the TCI state is part of a set of TCI states configured by an RRC.

Aspect 14: The method of any of aspects 1 through 13, further comprising: concurrently modifying UL and DL beam configurations based on the TCI state.

Aspect 15: The method of any one or more of claims 1-14, wherein the UL reference signal comprises an SRS.

Aspect 16: A method for wireless communication performed by a base station, comprising: receiving an UL reference signal from a UE; configuring a set of transmission configuration indication (TCI) states, the set of TCI states including at least one TCI state based at least in part on the received uplink (UL) reference signals; scheduling an PDSCH based at least in part on the at least one TCI state associated with the received UL reference signals.

Aspect 17: The method of aspect 16, wherein execution of the instructions causes the base station to perform operations further comprising: transmitting the at least one TCI state associated with the received UL reference signals to the UE; and transmitting, on the scheduled PDSCH, DL data to the UE based at least in part on the at least one TCI state.

Aspect 18: The method of aspect 17, wherein the at least one TCI state is transmitted to the UE in a DCI message.

Aspect 19: The method of any of aspects 17 through 18, wherein the TCI state indicates a quasi-collocation (QCL) relationship between the UL reference signal and one or more reference signals of the PDSCH.

Aspect 20: The method of aspect 19, wherein the QCL relationship comprises a spatial relationship between one or more first antenna ports used to receive the UL reference signal and one or more second antenna ports used to transmit the DL data on the PDSCH.

Aspect 21: The method of any of aspects 16 through 20, wherein the UL reference signal serves as a reference signal resource of the TCI state.

Aspect 22: The method of aspect 21, wherein the UL reference signal comprises an SRS, and the one or more reference signals comprise a demodulation reference signal (DM-RS) of the PDSCH.

Aspect 23: The method of aspect 22, wherein the UE transmits the SRS and receives the DL data on a same beam indicated by the TCI state.

Aspect 24: The method of any of aspects 16 through 23, wherein the TCI state further indicates a QCL relationship between a channel state information reference signal (CSI-RS) and the one or more reference signals of the PDSCH.

Aspect 25: The method of aspect 24, wherein the QCL relationship between the UL reference signal and the one or more reference signals of the PDSCH comprises a QCL-TypeD relationship, and the QCL relationship between the CSI-RS and the one or more reference signals of the PDSCH comprises one of a QCL-TypeA relationship, a QCL-TypeB relationship, or a QCL-TypeC relationship.

Aspect 26: The method of any of aspects 24 through 25, wherein the QCL relationships comprise an RRC configuration.

Aspect 27: The method of any of aspects 16 through 26, wherein execution of the instructions causes the base station to perform operations further comprising: determining a number of channel estimation parameters based on the UL reference signal; and configuring the at least one TCI state based at least in part on the number of channel estimation parameters determined from the UL reference signal.

Aspect 28: The method of aspect 27, wherein the number of channel estimation parameters includes one or more of a Doppler shift, a Doppler spread, an average delay, or an average spread.

Aspect 29: The method of any of aspects 16 through 28, wherein execution of the instructions causes the base station to perform operations further comprising: concurrently changing DL and UL beam indications based at least in part on the TCI state.

Aspect 30: The method of any one or more of claims 16 through 28, wherein the UL reference signal comprises an SRS.

Aspect 31: An apparatus for wireless communication performed by a UE, comprising a processor; memory coupled with the processor; and instructions stored in the memory and executable by the processor to cause the apparatus to perform a method of any of aspects 1 through 14.

Aspect 32: An apparatus for wireless communication performed by a UE, comprising at least one means for performing a method of any of aspects 1 through 14.

Aspect 33: A non-transitory computer-readable medium storing code for wireless communication performed by a UE, the code comprising instructions executable by a processor to perform a method of any of aspects 1 through 14.

Aspect 34: An apparatus comprising a processor; memory coupled with the processor; and instructions stored in the memory and executable by the processor to cause the apparatus to perform a method of any of aspects 15 through 15.

Aspect 35: An apparatus comprising at least one means for performing a method of any of aspects 15 through 15.

Aspect 36: A non-transitory computer-readable medium storing code the code comprising instructions executable by a processor to perform a method of any of aspects 15 through 15.

Aspect 37: An apparatus for wireless communication performed by a base station, comprising a processor; memory coupled with the processor; and instructions stored in the memory and executable by the processor to cause the apparatus to perform a method of any of aspects 16 through 29.

Aspect 38: An apparatus for wireless communication performed by a base station, comprising at least one means for performing a method of any of aspects 16 through 29.

Aspect 39: A non-transitory computer-readable medium storing code for wireless communication performed by a base station, the code comprising instructions executable by a processor to perform a method of any of aspects 16 through 29.

Aspect 40: An apparatus comprising a processor; memory coupled with the processor; and instructions stored in the memory and executable by the processor to cause the apparatus to perform a method of any of aspects 30 through 30.

Aspect 41: An apparatus comprising at least one means for performing a method of any of aspects 30 through 30.

Aspect 42: A non-transitory computer-readable medium storing code the code comprising instructions executable by a processor to perform a method of any of aspects 30 through 30.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, components, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, components, circuits and processes described above. Whether such functionality is implemented in hardware or software depends upon the application and design constraints imposed on the overall system.

The hardware and data processing apparatus used to implement the various illustrative logics, logical blocks, components and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more components of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software component which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for wireless communication at a user equipment (UE), comprising:
    transmitting an uplink reference signal to an access network node via a first beam, wherein the uplink reference signal comprises resources mapped to a transmission configuration indication state indicating a quasi-collocation (QCL) relationship between the uplink reference signal and one or more downlink reference signals associated with one or more downlink transmissions;
    receiving, from the access network node, the transmission configuration indication state of a set of transmission configuration indication states that are based at least in part on the uplink reference signal, the transmission configuration indication state indicating the first beam; and
    receiving the one or more downlink transmissions comprising downlink data from the access network node on a downlink channel via the first beam based at least in part on the transmission configuration indication state.

2. The method of claim 1, wherein reference the uplink signal serves as a reference signal resource of the transmission configuration indication state.

3. The method of claim 2, wherein the uplink reference signal comprises a sounding reference signal, the downlink channel comprises a physical downlink shared channel, and a set of downlink reference signals comprise a demodulation reference signal of a physical downlink shared channel.

4. The method of claim 1, wherein the QCL relationship comprises a spatial relationship between one or more first antenna ports used to receive the uplink reference signal and one or more second antenna ports used to transmit the downlink data.

5. The method of claim 1, wherein the transmission configuration indication state further indicates a QCL relationship between a channel state information reference signal and the one or more reference signals of the downlink channel.

6. The method of claim 5, wherein the QCL relationship between the uplink reference signal and the one or more reference signals of the downlink channel comprises a QCL-TypeD relationship, and the QCL relationship between the channel state information reference signal and the one or more reference signals of the downlink channel comprises one of a QCL-TypeA relationship, a QCL-TypeB relationship, or a QCL-TypeC relationship.

7. The method of claim 5, wherein the QCL relationship comprises a radio resource control configuration.

8. The method of claim 5, further comprising:
    receiving the channel state information reference signal from the access network node;
    determining a quantity of channel estimation parameters based at least in part on the channel state information reference signal; and decoding the downlink data based at least in part on the quantity of channel estimation parameters determined from the channel state information reference signal.

9. The method of claim 8, wherein the quantity of channel estimation parameters includes one or more of a Doppler shift, a Doppler spread, an average delay, or an average spread.

10. The method of claim 1, wherein the transmission configuration indication state is received from the access network node in a downlink control information message.

11. The method of claim 1, wherein the transmission configuration indication state is part of a set of transmission configuration indication states configured by a radio resource control.

12. The method of claim 1, further comprising:
concurrently modifying uplink and downlink beam configurations based on the transmission configuration indication state.

13. The method of claim 1, wherein the uplink reference signal comprises a sounding reference signal.

14. A method for wireless communication at an access network node, comprising:
receiving an uplink reference signal from a user equipment (UE) via a first beam, wherein the uplink reference signal comprises resources mapped to at least one transmission configuration indication state indicating a quasi-collocation (QCL) relationship between the uplink reference signal and one or more downlink reference signals associated with one or more downlink transmissions on a physical downlink shared channel;
configuring a set of transmission configuration indication states, the set of transmission configuration indication states including the at least one transmission configuration indication state based at least in part on the received uplink reference signal, the at least one transmission configuration indication data indicating the first beam; and
scheduling the physical downlink shared channel communication via the first beam based at least in part on the at least one transmission configuration indication state associated with the received uplink reference signal.

15. The method of claim 14, further comprising:
transmitting the at least one transmission configuration indication state associated with the received uplink reference signal to the UE; and
transmitting, on the scheduled physical downlink shared channel, downlink data to the UE based at least in part on the at least one transmission configuration indication state.

16. The method of claim 15, wherein the at least one transmission configuration indication state is transmitted to the UE in a downlink control information message.

17. The method of claim 15, wherein the transmission configuration indication state indicates a QCL relationship between the uplink reference signal and one or more reference signals of the physical downlink shared channel.

18. The method of claim 17, wherein the QCL relationship comprises a spatial relationship between one or more first antenna ports used to receive the uplink reference signal and one or more second antenna ports used to transmit downlink data on the physical downlink shared channel.

19. The method of claim 14, wherein the uplink reference signal comprises a sounding reference signal and serves as a reference signal resource of the transmission configuration indication state associated with the received reference signal comprising a demodulation reference signal of the physical downlink shared channel.

20. The method of claim 14, wherein the transmission configuration indication state further indicates a QCL relationship between a channel state information reference signal and one or more reference signals of the physical downlink shared channel.

21. The method of claim 20, wherein the QCL relationship between the uplink reference signal and the one or more reference signals of the physical downlink shared channel comprises a QCL-TypeD relationship, and the QCL relationship between the channel state information reference signal and the one or more reference signals of the physical downlink shared channel comprises one of a QCL-TypeA relationship, a QCL-TypeB relationship, or a QCL-TypeC relationship.

22. The method of claim 20, wherein the QCL relationship comprises a radio resource control configuration.

23. The method of claim 14, further comprising:
determining a quantity of channel estimation parameters based at least in part on the uplink reference signal, wherein the quantity of channel estimation parameters includes one or more of a Doppler shift, a Doppler spread, an average delay, or an average spread; and
configuring the at least one transmission configuration indication state based at least in part on the quantity of channel estimation parameters determined from the uplink reference signal.

24. The method of claim 14, further comprising:
concurrently changing downlink and uplink beam indications based at least in part on the transmission configuration indication state.

25. An apparatus, comprising:
one or more processors; and
a memory coupled to the one or more processors and storing instructions that, when executed by the one or more processors, cause the apparatus to perform operations comprising:
transmitting an uplink reference signal to an access network node via a first beam, wherein the uplink reference signal comprises resources mapped to a transmission configuration indication state indicating a quasi-collocation (QCL) relationship between the uplink reference signal and one or more downlink reference signals associated with one or more downlink transmissions;
receiving, from the access network node, the transmission configuration indication state of a set of transmission configuration indication states that are based at least in part on the uplink reference signal, the transmission configuration indication state indicating the first beam; and
receiving the one or more downlink transmissions comprising downlink data from the access network node on a downlink channel via the first beam based at least in part on the transmission configuration indication state.

26. The apparatus of claim 25, wherein the uplink reference signal serves as a reference signal resource of the transmission configuration indication state.

27. An apparatus, comprising:
one or more processors; and
a memory coupled to the one or more processors and storing instructions that, when executed by the one or more processors, cause the apparatus to perform operations comprising:

receiving an uplink reference signal from a user equipment (UE) via a first beam, wherein the uplink reference signal comprises resources mapped to at least one transmission configuration indication state indicating a quasi-collocation (QCL) relationship between the uplink reference signal and one or more downlink reference signals associated with one or more downlink transmissions on a physical downlink shared channel;

configuring a set of transmission configuration indication states, the set of transmission configuration indication states including the at least one transmission configuration indication state based at least in part on the received uplink reference signal, the at least one transmission configuration indication data indicating the first beam; and scheduling the physical downlink shared channel communication via the first beam based at least in part on the at least one transmission configuration indication state associated with the received uplink reference signal.

\* \* \* \* \*